US007971078B2

(12) United States Patent
Govindan et al.

(10) Patent No.: US 7,971,078 B2
(45) Date of Patent: Jun. 28, 2011

(54) SYSTEM AND METHOD FOR MEASUREMENT-BASED POWER AND ENERGY ACCOUNTING FOR VIRTUAL MACHINES

(75) Inventors: Sriram Govindan, State College, PA (US); Karthick Rajamani, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/172,151

(22) Filed: Jul. 11, 2008

(65) Prior Publication Data

US 2010/0011227 A1    Jan. 14, 2010

(51) Int. Cl.
*G06F 1/32* (2006.01)
(52) U.S. Cl. .............................. 713/300; 713/320; 718/1
(58) Field of Classification Search .................. 713/300, 713/320, 322, 323, 324; 718/1, 104; 702/186
See application file for complete search history.

(56) References Cited

U.S. PATENT DOCUMENTS

| 7,346,792 | B2 | 3/2008 | Anderson |
| 2002/0138774 | A1 | 9/2002 | Imada |
| 2005/0268078 | A1 | 12/2005 | Zimmer |
| 2006/0155415 | A1 | 7/2006 | Lefurgy |
| 2008/0201710 | A1 | 8/2008 | Anderson |
| 2009/0254660 | A1* | 10/2009 | Hanson et al. ................ 709/226 |

OTHER PUBLICATIONS

Stoess, et al., Energy Management for Hypervisor-Based Virtual Machines, , Annual Technical Conference, USENIX 2007.

* cited by examiner

*Primary Examiner* — Dennis M Butler
(74) *Attorney, Agent, or Firm* — Shimokaji & Associates, P.C.

(57) ABSTRACT

A method for measurement-based power and energy accounting for virtual machines distributed among at least one hosting device is disclosed. The method comprising determining an energy for the hosting device during a first time interval and a second time interval, partitioning a difference in the determined energy among virtual machines within a plurality of regions of the hosting device, determining a level of activity of each of the resources in each virtual machine within a corresponding one of the regions, determining an energy of each resource in each corresponding virtual machine wherein energy associated with resources shared among an plurality of virtual machines are allocated to a corresponding one of the virtual machines based on a number of requests made to the shared resource by the corresponding virtual machine, determining a total energy for each of the virtual machines in corresponding regions based on a level of activity of the virtual machine and the energy associated with the corresponding shared resources, and determining a power for each of the virtual machines by dividing the determined total energy by a length of the time interval.

1 Claim, 2 Drawing Sheets

SYSTEM AND METHOD FOR MEASUREMENT-BASED POWER AND ENERGY ACCOUNTING FOR VIRTUAL MACHINES

BACKGROUND OF THE INVENTION

The present invention is related to the field of power and resource management and more particularly with regard to a method and apparatus for determining the power and resources of each virtual machine operating within a plurality of computers or servers.

Newer server technology has incorporated large number of components into many existing servers. This technology reduces the need for an increased number of servers and their costs associated with power, cooling and real estate. The increasing power density of newer technology hardware, however, is reaching the limits of existing power and cooling supply as the number of servers or blades deployed within an existing infrastructure has been significantly increased. Power and cooling costs are also increasing because of rising and in terms of its environmental impact. In addition the thermal hot spots may be developed due to the increases in the power density of the hardware.

One of the well understood techniques for reducing energy consumption is to consolidate applications on fewer server machines. Previous work has looked at various methods of achieving the consolidation by varying the number of server machines based on the application's intensity. Server virtualization has further enabled higher degrees of consolidation by securely co-locating applications written for heterogeneous operating systems, also providing performance and resource isolation for those applications. Applications that were earlier running on individual physical servers are now run in virtual servers (virtual machines) and multiple virtual machines run on a physical machine.

Estimation of power and energy of multiple virtual machines is known in the art. For example, energy estimation may be based on the use of processor performance counters (see, for example, *Energy Management for Hypervisor-Based Virtual Machines*, Bellosa, et al., Annual Technical Conference, USENIX, 2007). However, many modern server systems have internal power measurement (and management) features that directly measure the power and energy consumption of the whole system and some components within the system. Typically whole system power and energy measurement is accurate and fast, with sampling done at short intervals, while lower-level component measurements are slower, requiring longer time intervals, and are less accurate. Other attempts to perform energy estimation based on thermal sensors have been attempted, but these sensors can have a relatively long time constant and generally cannot distinguish well between virtual machines that are time-division multiplexed onto the same hardware resources.

However, each of these methods fails to consider the presence of the virtual machines that are operating within the existing infrastructure or requires either a long time or an extensive amount of computer resources to determine the power usage.

Hence, there is a need for an improved method and apparatus for determining the power and energy requirements of each of the virtual machines operating within an infrastructure.

SUMMARY OF THE INVENTION

A method for measurement-based power and energy accounting for virtual machines distributed among at least one hosting device is disclosed. The method comprising determining an energy for the hosting device during a first time interval and a second time interval, determining a difference in energy between the first and second time intervals, partitioning the hosting device into a plurality of regions, determining a distribution of the virtual machines within corresponding regions among the hosting device, determining an energy for each of the plurality of regions by distributing the determined difference in energy among the plurality of regions, selecting a model for determining an energy of resources operating within a corresponding virtual machine within a corresponding one of the regions, determining a level of activity of each of the resources in each virtual machine within a corresponding one of the regions, the level of activity being determined based on at least one of: an instruction completion rate and a period of time the resources in the virtual machine are active, utilizing the selected model to determine an energy based on the determined level of activity of each resource in each corresponding virtual machine within a corresponding one of the plurality of regions, wherein energy associated with resources shared among an plurality of virtual machines are allocated to a corresponding one of the virtual machines based on a number of requests made to the shared resource by the corresponding one of the virtual machines, determining a total energy for each of the virtual machines in corresponding regions based on a level of activity of the virtual machine and the energy associated with the corresponding shared resources, determining a power for each of the virtual machines within a corresponding region by dividing the determined total energy within a corresponding region by a length of the time interval and outputting at least of the determined energy and the determined power of each virtual machine in each region.

These and other features, aspects and advantages of this invention of the present invention will become better understood with reference to the following drawings, description, and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
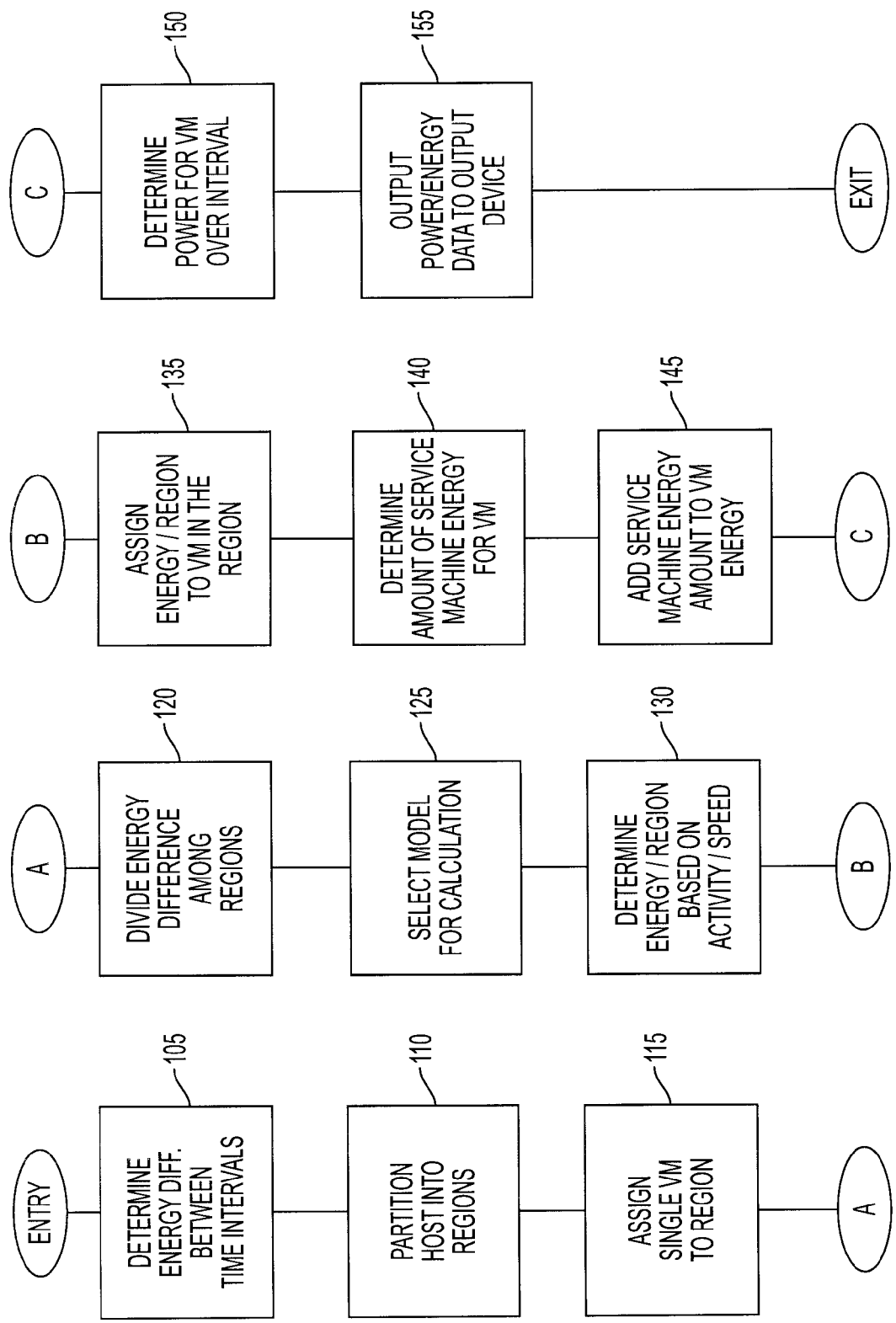
FIG. 1 illustrates a flow chart of an exemplary method for accounting for energy and power in virtual machines in accordance with the principles of the invention.

FIG. 1 illustrates a flow chart of an exemplary method for power and energy accounting of virtual machines, in accordance with the principles of the invention.

At block 105, the accumulated board-level energy, which is a fundamental measured quantity referred to herein, as Energy Accumulation Register or EAR, for each board or blade in a hosting device or infrastructure may be obtained during a sampling interval, t. The intervals, t, correspond to the EAR sampling interval or multiples of the physical sampling done to accumulate the EAR value. Typically, intervals, t, are of a constant time length. In addition a difference in energy may be determined as:

$$\Delta EAR_t = EAR_t - EAR_{t-1} \text{ is always} > 0 \quad (1)$$

At block 110, the machine or host (server, computer) upon which the virtual machines are hosted, are first divided into spatial regions $R_i$ with disjoint sets of processors, memory and I/O devices, so that machine $$M = \{R_0, \ldots, R_{n-1}\}. \quad (2)$$

A region typically has at least one processor and some amount of memory assigned to it.

If $VM = \{VM_0, \ldots VM_{m-1}\}$ are the virtual machines on machine M, then for any $VM_i$, $VM_i$ may be assigned to precisely one region $R_k$, at block 115. An assignment function A(VM) may be formulated that maps virtual machines to regions. Assignment function "A" may change over time, however, such changes are relatively slow and are ignored in this description of the invention. In another aspect of the invention, virtual machines may span more than one region. However, in order to describe the principles of the invention, a single VM per region is discussed herein for ease of illustration.

At block 120, the $\Delta EAR_t$ may be divided among the regions $R_i$. The sum of the energy per region ($\Delta EAR_t(R_i)$) typically equals $\Delta EAR_t$. There can be three (3) components to the accumulated energy per region.

1. The base overhead due to the size of the region in terms of the physical resources assigned to it;
2. Busses and planar logic are considered to be pure overhead which are allocated to the region in proportion to its size in terms of number of processors; and
3. The power settings and activity levels of the resources (i.e., res) in the region during the current interval. Resources may be processors, memories, input/output devices, etc.

At block 125, an energy model of the form of E (speed(res), activity(res)) may be used to calculate energy per region, $\Delta EAR_t(R_i)$ which may be determined as:

$$\Delta EAR_t(R_i) = \Delta EAR_t * [(\Sigma_{res} E(speed_t(res), activity_t(res))) / \Sigma_R \Sigma_{res} E(speed_t(res), activity_t(res))] \quad (3)$$

where "res" represents resources associated within the regions;
activity represents activity of the resources, which my be determined by counters to collect activity indicators such as instruction completion rate and period of time;
speed represents a speed of the resources.

The energy model may be specified a priori, or may be determined from individual component level power measurements or developed from an amount of energy consumed by the resources within a region.

At block 135, the proportion of $\Delta EAR_t(R_i)$ assigned to a particular $VM_j$ running (active) in $R_i$ during interval, t, can represent the proportion of the time that the $VM_j$ was active. This may be represented as:

$$\Delta IEAR_t(VM_j) = (active_t(VM_j)/|t|) * \Delta EAR_t(R_i) \quad (4)$$

The value $\Delta IEAR_t(VM_j)$ can represent the base energy accumulated for the $j^{th}$ VM. However, there are environments that include shared virtual machines that share a resource, such as virtual I/O servers. Therefore, a more accurate. $\Delta EAR_t(VM_j)$ can incorporate a proportion of the energy accumulated by all of the server virtual machines that are being shared during interval t. The proportioning, in one aspect of the invention, may be determined based upon request rate from a particular client or virtual machine to a selected one of the shared resources.

At block 140, let S be the set of service machines that provide services to virtual machines operating on a physical device. Then the energy consumption of the S service machines may be split among their client virtual machines based on the percentage of utilization during interval t. If no client virtual machine uses a particular service machine in S during t, then the service machine has to be treated as pure overhead and may be divided equally among the client virtual machines. So for each $VM_k$ in S, the charge to each $VM_j$ not in S may be determined as:

$$\Delta IEAR_t(VM_j, VM_k) = Util_t(VM_j, VM_k) * \Delta IEAR_t(VM_j) \quad (5)$$

if $VM_k$ is used at all during t where $0 <= Util_t(VM_j, VM_k) <= 1$; and $$\Delta IEAR_t(VM_j, VM_k) = 1/(|VM| - |S|) * \Delta IEAR_t(VM_j)$$

if $VM_k$ is not used during t.
wherein $Util_t(VM_j, VM_k)$ represents the utilization of a service virtual machine by a client as a percentage of the total requests handled during interval t that came from the client and may be determined as:

$$Util_t(VM_j, VM_k) = |requests(j,k)|/(\Sigma_j |requests(j,k)|)$$

At block 145, the accumulated energy of the VM including the energy of the services machines it uses (see block 140) may be determined as:

$$\Delta EAR_t(VM_j) = \Delta IEAR_t(VM_j) + \Sigma_s \Delta IEAR_t(VM_j, VM_k) \quad (6)$$

At block 150, a power for the virtual machine in an interval t may be determined by dividing the energy, $\Delta EAR_t(VM_j)$, by the length of the interval, t. The determined total power and/or energy or the determined power and/or energy of each region or each virtual machine may then be displayed or provided to a second processing unit, for example.

Figure 2:
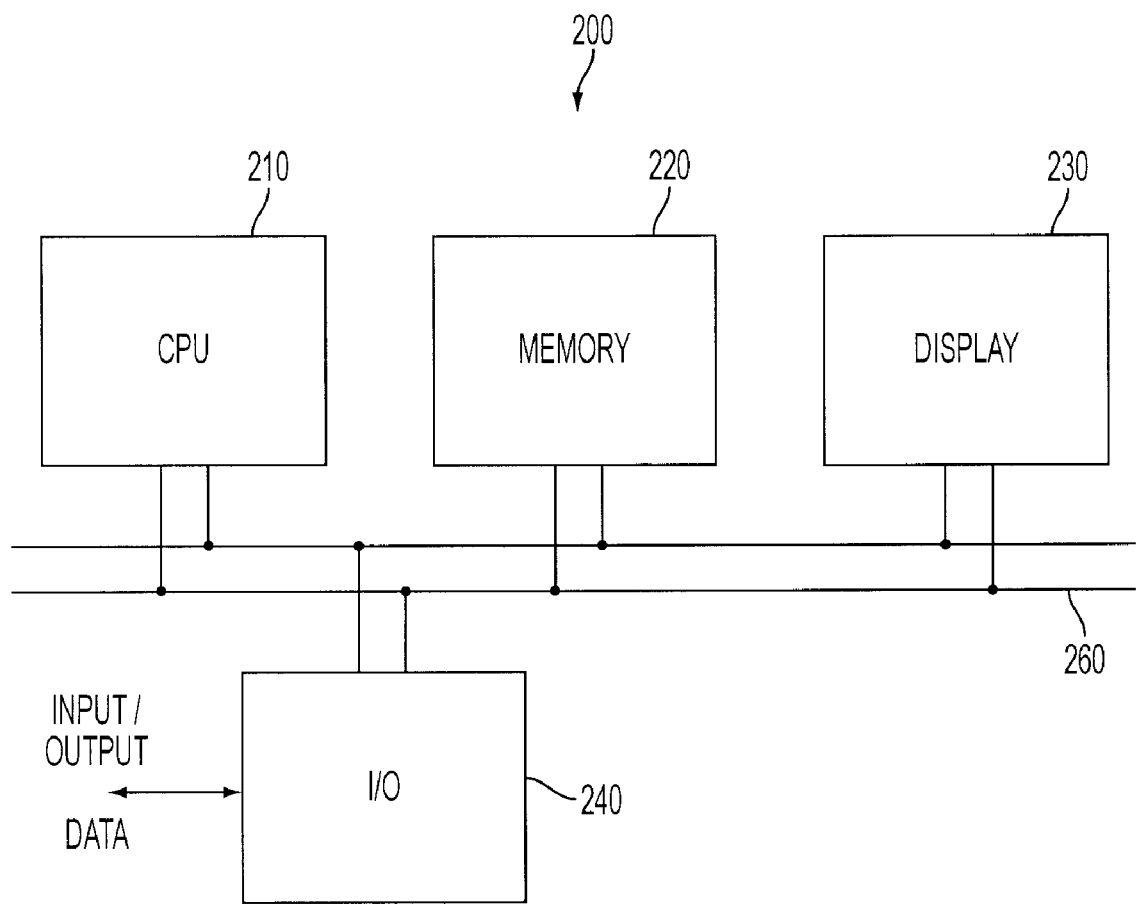
FIG. 2 illustrates a system for accounting for energy and power in virtual machines in accordance with the principles of the invention.

FIG. 2 illustrates an exemplary system 200 for power and energy accounting for virtual machines, in accordance with the principles of the invention as shown in FIG. 1. In this exemplary system embodiment, a processor (CPU) 210, memory 220, display 230, and I/O device 240 may each be in communication via a communication bus 260. Processor 210 may be any type of processor that receives known inputs and performs one or more processing steps under the direction of programming instructions. Processor 210 may be CISC (complete instruction set computer) or RISC (reduced instruction set computer) type processor. Memory 220 may be, for example, a solid-state semiconductor memory represented as RAM, ROM, EPROM, Flash, etc., that may store data and/or instructions that provide instruction to processor 210. The instructions, i.e., code, may be stored in permanent memory, e.g., PROM, and variable or changeable data may be store in RAM.

Display 230 may be used to present a list of the powers measured in each virtual machine (see FIG. 1, block 155).

I/O device 240 may provide a means for inputting and outputting information to and from processor 210. For example, I/O device 240 may receive information from one or more program blocks. This information may be provided to processor 210 to process each block, in turn. The results may then be displayed upon each block on display 230. Although not shown it would be appreciated that the data may be provided from or to a network, such as a WAN, LAN, POTS and the Internet.

It would be recognized by those skilled in the art, that the invention described herein can take the form of an entirely hardware embodiment, an entirely software embodiment, or an embodiment containing both hardware and software elements. In an exemplary embodiment, the invention may be implemented in software, which includes but is not limited to firmware, resident software, microcode, etc.

In this case, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

It is to be understood that the specific embodiments of the invention that have been described are merely illustrative of certain applications of the principle of the present invention. Numerous modifications may be made to a system and method for automatically relating components of a storage area network in a volume container described herein without departing from the spirit and scope of the present invention.

What is claimed is:

1. A method for measurement-based power and energy accounting for virtual machines executing on a hosting device said method comprising:

determining an energy for the hosting device during a first time interval and a second time interval;

determining a difference in energy between said first and second time intervals;

partitioning said hosting device into a plurality of regions;

determining a distribution of said virtual machines within corresponding regions among said hosting device;

determining an energy for each of said plurality of regions by distributing the determined difference in energy among said plurality of regions;

selecting a model for determining an energy of resources operating within a corresponding virtual machine within a corresponding one of said regions;

determining a level of activity of each of said resources in each virtual machine within a corresponding one of said regions, said level of activity being determined based on at least one of: an instruction completion rate and a period of time said resources in said virtual machine are active;

utilizing said selected model to determine an energy based on said determined level of activity of each resource in each corresponding virtual machine within a corresponding one of said plurality of regions, wherein energy associated with resources shared among an plurality of virtual machines are allocated to a corresponding one of said virtual machines based on a number of requests made to said shared resource by said corresponding one of said virtual machines;

determining a total energy for each of said virtual machines in corresponding regions based on a level of activity of said virtual machine and the energy associated with the corresponding shared resources;

determining a power for each of said virtual machines within a corresponding region by dividing the determined total energy within a corresponding region by a length of the time interval; and outputting at least of said determined energy and said determined power of each virtual machine in each region.

* * * * *